(12) United States Patent
Daudet et al.

(10) Patent No.: US 10,273,679 B2
(45) Date of Patent: Apr. 30, 2019

(54) SLIDE CLIP CONNECTOR

(71) Applicants:Larry Randall Daudet, Brentwood, CA (US); Hien Nguyen, San Ramon, CA (US); Timothy M. Stauffer, Pleasant Hill, CA (US); Jin-Jie Lin, Livermore, CA (US)

(72) Inventors: Larry Randall Daudet, Brentwood, CA (US); Hien Nguyen, San Ramon, CA (US); Timothy M. Stauffer, Pleasant Hill, CA (US); Jin-Jie Lin, Livermore, CA (US)

(73) Assignee: Simpson Strong-Tie Company Inc., Pleasanton, CA (US)

(*) Notice: Subject to any disclaimer, the term of this patent is extended or adjusted under 35 U.S.C. 154(b) by 0 days.

(21) Appl. No.: 15/405,125

(22) Filed: Jan. 12, 2017

(65) Prior Publication Data

US 2017/0204599 A1   Jul. 20, 2017

Related U.S. Application Data

(60) Provisional application No. 62/281,144, filed on Jan. 20, 2016.

(51) Int. Cl.
*E04B 1/24* (2006.01)
*E04B 1/36* (2006.01)
(Continued)

(52) U.S. Cl.
CPC .............. *E04B 1/36* (2013.01); *E04B 1/2403* (2013.01); *E04B 1/40* (2013.01); *E04B 1/98* (2013.01); *E04B 2/88* (2013.01); *E04B 2/96* (2013.01); *F16M 13/02* (2013.01); *E04B 2001/2415* (2013.01); *E04B 2001/2439* (2013.01); *E04B 2001/405* (2013.01)

(58) Field of Classification Search
CPC . E04B 1/2403; E04B 1/36; E04B 2/88; E04B 1/98; E04B 1/40; E04B 2001/2415; E04B 2001/2439; E04B 2001/405; F16M 13/02
See application file for complete search history.

(56) References Cited

U.S. PATENT DOCUMENTS 1,729,935 A   10/1929   Froehlich
2,065,529 A   12/1936   Kehr et al.
(Continued)

FOREIGN PATENT DOCUMENTS

WO   WO-96/31667 A1   10/1996
WO   WO 98/51889      11/1998

OTHER PUBLICATIONS

Remarks filed in related EPO Application No. 17152308.7 (7 pages). (Year: 2018).*
(Continued)

*Primary Examiner* — Rodney Mintz
(74) *Attorney, Agent, or Firm* — James R. Cypher; Charles R. Cypher

(57) ABSTRACT

An improved connection between supported and supporting structural members, particularly for use in structures where the supported member needs to move with respect to the supporting member. The connector has an anchoring leg that allows for the back of the anchoring leg on either side of the sliding leg.

20 Claims, 18 Drawing Sheets

(51) Int. Cl.
- *E04B 2/88* (2006.01)
- *E04B 1/98* (2006.01)
- *E04B 1/41* (2006.01)
- *E04B 1/38* (2006.01)
- *F16M 13/02* (2006.01)
- *E04B 2/96* (2006.01)

(56) References Cited

U.S. PATENT DOCUMENTS

| | | | |
|---|---|---|---|
| 2,218,426 A | 10/1940 | Hurlbert, Jr. | |
| 2,365,478 A | 12/1944 | Grotta | |
| 3,003,600 A | 10/1961 | MacKenzie | |
| 3,038,568 A | 6/1962 | Morgan | |
| 3,321,880 A | 5/1967 | Ferrell et al. | |
| 3,490,797 A | 1/1970 | Platte | |
| 3,537,219 A | 11/1970 | Navarre | |
| 3,715,850 A | 2/1973 | Chambers | |
| 3,798,865 A | 3/1974 | Curtis | |
| 3,805,465 A | 4/1974 | Dietrich | |
| 3,972,168 A | 8/1976 | Allen | |
| 4,067,168 A | 1/1978 | Thurner | |
| 4,121,391 A | 10/1978 | Schroeder | |
| 4,140,294 A | 2/1979 | Zwarts | |
| 4,433,524 A | 2/1984 | Matson | |
| 4,570,400 A | 2/1986 | Slager et al. | |
| 4,594,017 A | 6/1986 | Hills | |
| 4,665,672 A | 5/1987 | Commins et al. | |
| 4,717,279 A | 1/1988 | Commins | |
| 4,796,403 A | 1/1989 | Fulton et al. | |
| 4,819,401 A | 4/1989 | Whitney, Jr. | |
| 4,825,621 A | 5/1989 | Jensen | |
| 4,843,776 A | 7/1989 | Guignard | |
| 4,890,436 A | 1/1990 | Colonias | |
| 4,897,979 A | 2/1990 | Colonias | |
| 4,917,403 A | 4/1990 | Gyoda et al. | |
| 4,936,182 A | 6/1990 | Bunker | |
| 4,949,929 A | 8/1990 | Kesselman et al. | |
| 4,967,929 A | 11/1990 | Turner | |
| 5,027,494 A | 7/1991 | Martin | |
| 5,046,294 A | 9/1991 | Platt | |
| 5,048,243 A * | 9/1991 | Ward | E04H 3/02 |
| | | | 52/167.4 |
| 5,092,097 A | 3/1992 | Young | |
| 5,113,631 A | 5/1992 | diGirolamo | |
| 5,127,760 A | 7/1992 | Brady | |
| 5,216,858 A | 6/1993 | Gilmour | |
| 5,249,404 A | 10/1993 | Leek et al. | |
| 5,259,685 A | 11/1993 | Gilb | |
| 5,265,396 A | 11/1993 | Amimoto | |
| 5,313,752 A | 5/1994 | Hatzinikolas | |
| 5,323,577 A | 6/1994 | Whitmyer | |
| 5,328,287 A | 7/1994 | Gilb | |
| 5,333,435 A | 8/1994 | Leek | |
| 5,402,612 A | 4/1995 | diGirolamo | |
| 5,467,566 A * | 11/1995 | Swartz | E04B 2/96 |
| | | | 52/235 |
| 5,467,570 A | 11/1995 | Leek | |
| 5,471,805 A | 12/1995 | Becker | |
| 5,555,694 A | 9/1996 | Commins | |
| 5,572,844 A | 11/1996 | Stackenwalt et al. | |
| 5,577,860 A | 11/1996 | Plank | |
| 5,611,179 A | 3/1997 | Leek | |
| 5,640,823 A | 6/1997 | Bergeron et al. | |
| 5,664,392 A | 9/1997 | Mucha | |
| 5,671,580 A | 9/1997 | Chou | |
| 5,689,922 A | 11/1997 | Daudet | |
| 5,720,465 A | 2/1998 | Peltzer | |
| 5,720,571 A * | 2/1998 | Frobosilo | E04B 2/96 |
| | | | 403/2 |
| 5,755,066 A | 5/1998 | Becker | |
| 5,846,018 A * | 12/1998 | Frobosilo | E04B 2/96 |
| | | | 403/2 |
| 5,876,006 A * | 3/1999 | Sharp | E04B 1/2403 |
| | | | 248/297.21 |
| 5,904,023 A | 5/1999 | diGirolamo et al. | |
| 5,906,080 A * | 5/1999 | diGirolamo | E04B 2/7453 |
| | | | 411/546 |
| 5,913,788 A | 6/1999 | Herren | |
| 5,937,605 A | 8/1999 | Wendt | |
| 5,979,130 A | 11/1999 | Gregg et al. | |
| 5,983,589 A | 11/1999 | Daudet | |
| 6,058,668 A | 5/2000 | Herren | |
| 6,088,982 A | 7/2000 | Hiesberger | |
| 6,112,495 A | 9/2000 | Gregg et al. | |
| 6,158,188 A | 12/2000 | Shahnazarian | |
| 6,199,929 B1 | 3/2001 | Hansch | |
| 6,213,679 B1 * | 4/2001 | Frobosilo | E04B 2/82 |
| | | | 403/14 |
| 6,230,466 B1 | 5/2001 | Pryor | |
| 6,301,854 B1 | 10/2001 | Daudet et al. | |
| 6,430,890 B1 | 8/2002 | Chiwhane et al. | |
| 6,591,562 B2 | 7/2003 | Ting | |
| 6,598,361 B2 | 7/2003 | Ting | |
| 6,612,087 B2 * | 9/2003 | diGirolamo | E04B 2/767 |
| | | | 403/403 |
| 6,668,510 B2 | 12/2003 | McManus | |
| 6,688,069 B2 * | 2/2004 | Zadeh | E04B 1/2403 |
| | | | 52/712 |
| 6,691,482 B1 | 2/2004 | Ault | |
| 6,698,971 B1 | 3/2004 | Wilhelmi | |
| 6,701,689 B2 | 3/2004 | diGirolamo | |
| 6,719,481 B2 | 4/2004 | Hoffmann | |
| 6,748,705 B2 | 6/2004 | Orszulak et al. | |
| 6,792,733 B2 | 9/2004 | Wheeler et al. | |
| 6,799,407 B2 | 10/2004 | Saldana | |
| 6,843,035 B1 | 1/2005 | Glynn | |
| 6,854,237 B2 | 2/2005 | Surowiecki | |
| 6,871,470 B1 | 3/2005 | Stover | |
| 6,883,785 B1 | 4/2005 | Knapp | |
| 7,104,024 B1 * | 9/2006 | diGirolamo | E04B 2/767 |
| | | | 403/231 |
| RE39,462 E | 1/2007 | Brady | |
| 7,174,690 B2 * | 2/2007 | Zadeh | E04B 1/2403 |
| | | | 52/712 |
| 7,225,590 B1 | 6/2007 | diGirolamo et al. | |
| 7,293,393 B2 | 11/2007 | Kelly et al. | |
| 7,299,593 B1 | 11/2007 | diGirolamo et al. | |
| 7,451,573 B2 | 11/2008 | Orszulak et al. | |
| 7,478,508 B2 * | 1/2009 | Peterson | E04B 2/96 |
| | | | 248/300 |
| 7,503,150 B1 * | 3/2009 | diGirolamo | E04B 2/96 |
| | | | 403/403 |
| 7,520,100 B1 | 4/2009 | Herrman et al. | |
| 7,533,508 B1 * | 5/2009 | diGirolamo | E04B 2/58 |
| | | | 248/300 |
| 7,559,519 B1 | 7/2009 | Dragic et al. | |
| 7,596,921 B1 | 10/2009 | diGirolamo et al. | |
| 7,617,643 B2 | 11/2009 | Pilz et al. | |
| 7,634,889 B1 | 12/2009 | diGirolamo et al. | |
| 7,640,701 B2 | 1/2010 | Rutherford | |
| 7,644,549 B2 | 1/2010 | Speck | |
| 7,681,365 B2 | 3/2010 | Klein | |
| 7,716,899 B2 | 5/2010 | Beck et al. | |
| 7,735,295 B2 | 6/2010 | Surowiecki | |
| 7,739,850 B2 | 6/2010 | Daudet | |
| 7,752,817 B2 | 7/2010 | Pilz et al. | |
| 7,788,878 B1 | 9/2010 | diGirolamo et al. | |
| D644,503 S * | 9/2011 | Crane | D8/354 |
| 8,091,316 B2 | 1/2012 | Beck et al. | |
| 8,181,419 B1 * | 5/2012 | diGirolamo | E04B 2/768 |
| | | | 248/909 |
| 8,387,321 B2 | 3/2013 | diGirolamo et al. | |
| 8,511,032 B2 * | 8/2013 | Abdel-Rahman | E04B 2/88 |
| | | | 248/228.1 |
| 8,555,592 B2 * | 10/2013 | Daudet | E04B 1/2403 |
| | | | 52/489.1 |
| 9,115,489 B2 * | 8/2015 | Bourdon | E04B 2/90 |
| D814,905 S * | 4/2018 | Ralph | D8/349 |
| D815,313 S * | 4/2018 | Ralph | D25/199 |
| D815,314 S * | 4/2018 | Ralph | D25/199 |
| D815,315 S * | 4/2018 | Ralph | D25/199 |
| D815,316 S * | 4/2018 | Ralph | D25/199 |

(56) References Cited

U.S. PATENT DOCUMENTS

| | | | |
|---|---|---|---|
| RE46,844 E * | 5/2018 | diGirolamo | E04B 1/2403 |
| D817,149 S * | 5/2018 | Ralph | D8/349 |
| 10,087,617 B2 * | 10/2018 | Daudet | E04B 1/2403 |
| 2002/0023405 A1 * | 2/2002 | Zadeh | E04B 1/2403 52/714 |
| 2002/0062617 A1 * | 5/2002 | diGirolamo | E04B 2/767 52/688 |
| 2004/0118075 A1 * | 6/2004 | Zadeh | E04B 1/2403 52/715 |
| 2005/0086905 A1 | 4/2005 | Ralph et al. | |
| 2005/0284041 A1 * | 12/2005 | Chen | F16M 7/00 52/167.5 |
| 2006/0032180 A1 * | 2/2006 | Peterson | E04B 2/96 52/712 |
| 2006/0096192 A1 | 5/2006 | Daudet | |
| 2006/0185311 A1 * | 8/2006 | Attalla | E04B 7/045 52/639 |
| 2006/0260259 A1 | 11/2006 | Morse | |
| 2009/0113839 A1 | 5/2009 | Carr | |
| 2009/0173036 A1 | 7/2009 | Hand | |
| 2009/0193750 A1 * | 8/2009 | Klima | E04B 2/96 52/712 |
| 2012/0247059 A1 * | 10/2012 | Daudet | E04B 1/2403 52/705 |
| 2013/0139466 A1 * | 6/2013 | Abdel-Rahman | E04B 2/88 52/655.1 |
| 2015/0068153 A1 * | 3/2015 | Bourdon | E04B 2/90 52/702 |
| 2017/0044787 A1 * | 2/2017 | di Girolamo | E04H 9/021 |
| 2017/0204600 A1 * | 7/2017 | Daudet | E04B 1/36 |
| 2018/0066424 A1 * | 3/2018 | Daudet | E04B 1/40 |
| 2018/0066425 A1 * | 3/2018 | Ralph | E04B 1/2403 |
| 2018/0135293 A1 * | 5/2018 | Daudet | E04B 2/768 |
| 2018/0320372 A1 * | 11/2018 | Daudet | E04B 2/768 |

OTHER PUBLICATIONS

Schafer, B.W., et al., "Accommodating Building Deflections: What every EOR should know about accommodating deflections in secondary cold-formed steel systems." NCSEA/CASE/SEI, Structure Magazine, Apr. 2003, Chicago.

"International Search Report and The Written Opinion of the International Searching Authority," PCT/US2012/030963, Jul. 30, 2012, 6 pages.

"Curtainwall Deflection Solutions," Super Stud Building Products, Inc. Product Catalog, 2001, 24 pages including front cover. Super Stud Building Products, Inc., Edison.

"Redi Klip Submittal: Head-of-Wall Positive Attachment Deflection Clip," Total Steel Solution, as early as May 22, 2013, 2 pages, USA.

"Posi Klip Product Information: Head-of-Wall Positive Attachment Deflection Clip," FireTrak Corporation, as early as May 22, 2013, 1 page, USA.

"Sliptrack Systems: Slotted Deflections Track Systems for Interior and Exterior Walls," SlipTrack Systems, 2003, 6 pages. Dietrich Metal Framing: A Worthington Industries Company, USA.

"TSN Products: Steel framing products," The Steel Network TSN website, 2010, 2 pages. The Steel Network, Inc., USA.

"TSN Product: VertiClip® SLB," The Steel Network TSN website, Dec. 26, 2012, 2 pages, The Steel Network, Inc., USA.

"Priceless Steel Products Clip Central," Priceless Steel Products Website, Aug. 30, 2010, 2 pages. Scafco Steel Stud Manufacturing Co., WA.

"Bypass Slab Slip Clip: PLC2," Priceless Steel Product Catalog, as early as May 22, 2013, p. 12-13. Scafco Steel Stud Manufacturing Co., WA.

"SLP-TRK® Slotted Track (BDTK)," "Head of Wall," SlipTrack Systems, as early as Jul. 2010, p. 26-29. Dietrich Metal Framing: A Worthington Industries Company, USA.

"Curtainwall Deflection Solutions," Buy Super Stud Website, Aug. 2010, 2 pages. Super Stud Building Products, Inc., Edison.

"Curtain Wall Systems", "Jam Stud Introduction", "Design Considerations", "Header/Sill Solutions", "Connections", "VertiClip: Vertical Deflection Connectors", "DriftClip and DriftTrk: Vertical Deflection and Lateral Drift", "Bridging", "Design Software," TSN The Steel Network Product Catalog, May 2009, cover page, p. 1, 4, 18, 30-33, 35, 36, back cover. The Steel Network, Inc., USA.

Search Report for European Patent Appl. 17152308.7, Aug. 17, 2017, 9 pages, European Patent Office, Munich, Germany.

"DWSC Seismic Clip," Brochure, as early as Aug. 21, 2014, Marino\Ware, South Plainfield, New Jersey.

"Single Slip Clip Detail," Disclosure, Aug. 12, 2011, 1 page, Olmar Supply Inc., Livermore, California.

"Double Slip Clip Detail," Disclosure, Aug. 12, 2011, 1 page, Olmar Supply Inc., Livermore, California.

Written Opinion of the International Searching Authority, international patent application PCT/US2018/014569, Jun. 1, 2018, 5 pages, European Patent Office, Rijswijk, NL.

Notification of Transmittal of the International Search Report and the Written Opinion of the International Searching Authority, or the Declaration, international patent application PCT/US2018/014569, Jun. 1, 2018, 6 pages, European Patent Office, Rijswijk, NL.

* cited by examiner

SLIDE CLIP CONNECTOR

BACKGROUND OF THE INVENTION

The present invention belongs to a class of mounting clips that are useful in the construction of buildings, particularly commercial buildings where a non-load bearing, exterior curtain wall is connected to the load bearing elements of a building and the curtain wall needs to be able to move with respect to the load bearing elements.

It is often advantageous to attach curtain walls systems to the load bearing elements of a building with connectors that permit a degree of relative movement between the wall system and other components of the building. There are many reasons for this. For example there can be extreme differences in temperature between the exterior curtain walls and the interior load bearing systems, and because the exterior curtain wall and the load bearing system often have different coefficients of expansion based on their different materials, under extreme temperature differences the curtain wall wants to shift with respect to the load bearing system. Exterior walls of buildings are also subject to deflection from wind and seismic forces. Furthermore, curtain walls are typically not designed to support vertical loads and must therefore by isolated from deflection of the primary load-bearing support structure of the building due to changes in live or dead loads carried by that structure. Providing a degree of freedom of movement within the wall and between the wall and the other components of a building can reduce stress and prevent fracture of connected parts due to the loading of the building, seismic and wind events or differences in the temperatures of the curtain wall and the load bearing elements.

A number of slide, or slip clips that permit relative movement between structural members have been patented.

U.S. Pat. No. 5,467,566, issued in 1995 to Allan J. Swartz and Gregory A. Kulpa teaches a slide clip where a fastener having a washer or spacer is connected to the supported member, and the slide clip is attached to the supporting member and to the fastener with the washer in such a manner that the slide clip can move with respect to the supported member. To allow relative movement between the fastener and the slide clip, Swartz and Kulpa taught that the spacer or washer on the fastener should be received in slots in the portion of the slide clip lying against the supported member and the spacer or washer should be thicker than the receiving portion of the slide clip. Planar flaps or extensions which were part of the washer or spacer and disposed parallel to the receiving portion of the slide clip extend over the receiving portion of the slide clip and prevent it from pulling away.

U.S. Pat. No. 5,876,006, issued in 1999 to Terry L. Sharp and Richard C. Eldenburg also teaches a slide clip where a spacer or fixed bracket is connected to the supported member and a slide clip is attached to the supporting member and the fixed bracket in such a manner that the slide clip can move with respect to the supported member. Like Swartz and Kulpa, to allow relative movement between the fixed bracket and the slide clip, Sharp and Eldenburg taught that the fixed bracket should have an engaging component received by the portion of the slide clip lying against the supported member that is thicker than the receiving portion of the slide clip. Also, like Swartz and Kulpa, they taught that a planar securing component which is attached to the engaging component extended in parallel relation over the receiving portion of the slide clip. In Sharp and Eldenburg, their spacer or fixed bracket was a plate having a thickness that was greater than the portion of the slide clip that received it, thus the securing component that projected only outwardly from the top of the engaging component would not interfere with the movement of the slide clip in the plane of the supporting member but keep it from pulling away.

Patents with similar teachings include U.S. Pat. No. 6,213,679, issued in 2001 to Frobosilo and Viola, and U.S. Pat. No. 5,906,080, issued in 1999 to DiGirolamo and Mountcastle.

The slide clip of the present invention provides a uniquely shaped slide clip that is not prone to buckling under load.

BRIEF SUMMARY OF THE INVENTION

A first aspect of the invention provides a slide clip that has a unique geometry to more optimally distribute loads among fasteners and thereby avoid buckling of the anchoring leg of the slide clip. In particular, a distal section of the anchoring leg projects away from both the front and back surfaces of the sliding leg, and the first fasteners attach the distal section of the anchoring leg to the supporting member, and at least one of the first fasteners engages a portion of the distal section that projects away from the back surface of the sliding leg, on the same side of the sliding leg as the supported member. This reduces the eccentricity of the connection to the securing member.

A second aspect of the invention provides a slide clip that has a unique slider that is used in one or more elongated slots in the clip to provide improved rotational support to the slide clip and thereby avoid buckling of the anchoring leg of the slide clip. In particular, the slider has a securing component, and the securing component has one or more generally planar upstanding flanges connected to and set at an angle to the one or more base components, such that a projection along the generally planar upstanding flange would intersect with the sliding leg. This tall flange disposed at an angle to the sliding leg improves the strength of the securing component to resist the sliding leg of the slide clip pulling away from the secured member.

DETAILED DESCRIPTION OF THE INVENTION

Figure 1:
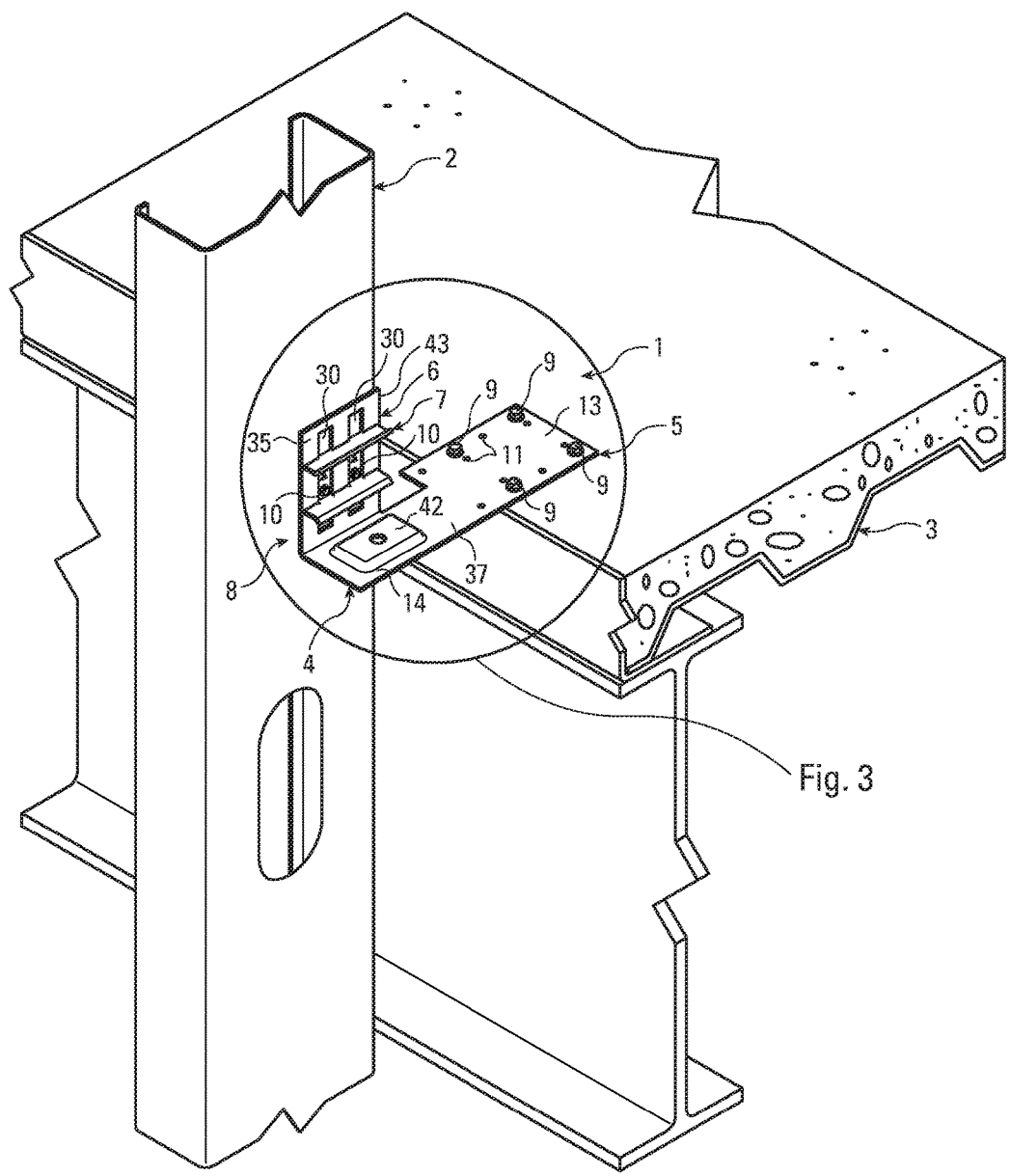
FIG. 1 is a perspective view of a connection formed according to the present invention.
Figure 2:
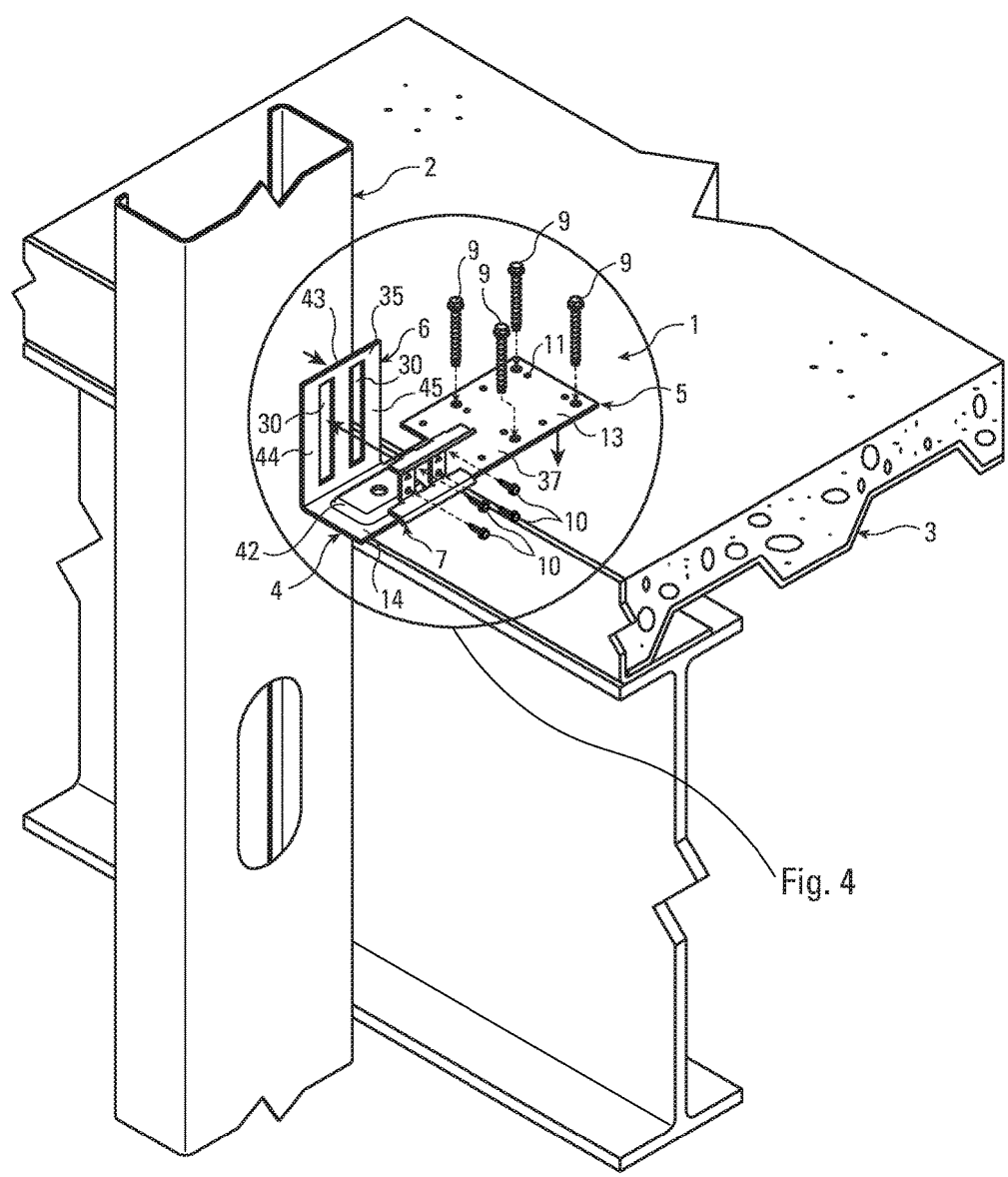
FIG. 2 is an exploded, perspective view of the connection of FIG. 1.
Figure 3:
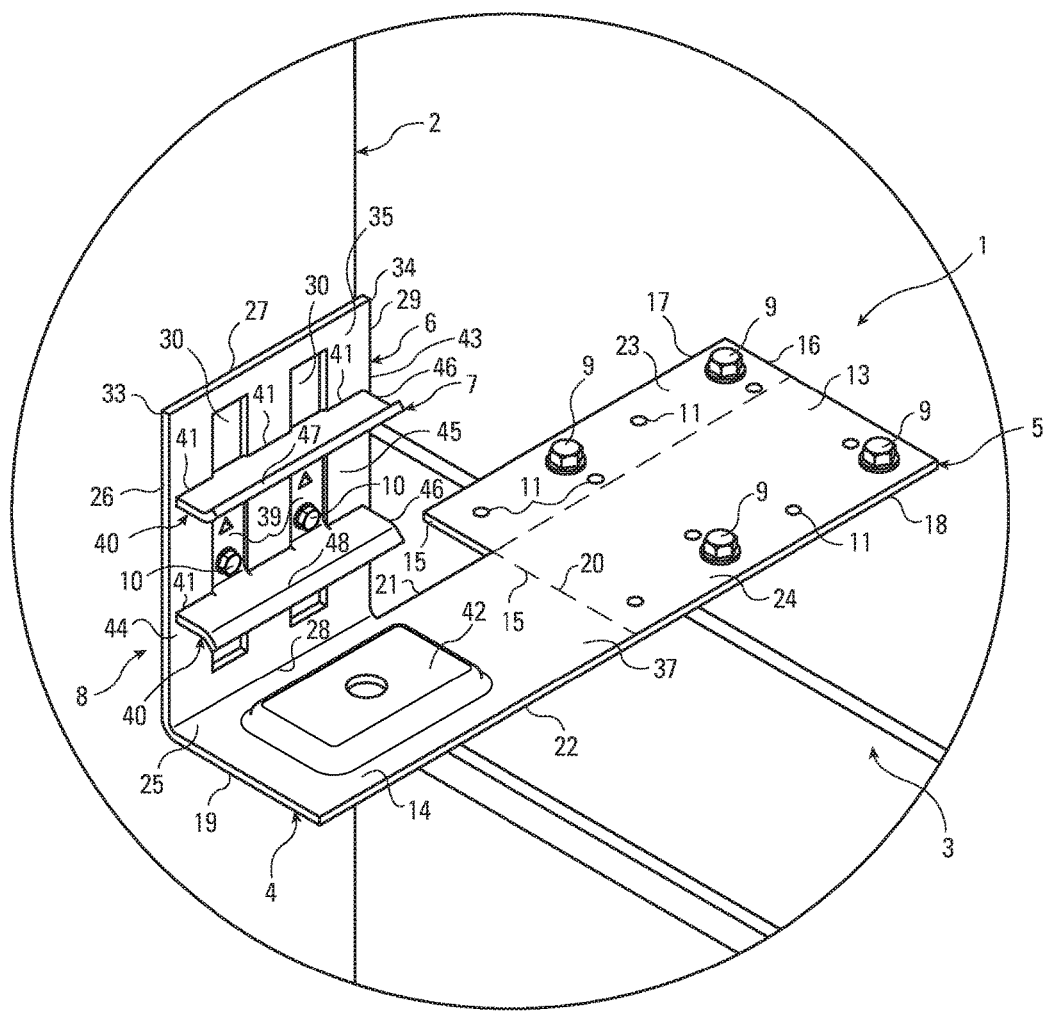
FIG. 3 is a detail perspective view of the connection of FIG. 1, taken along line FIG. 3 of FIG. 1.

The present invention is a structural connection 1 between a first building structural member or supporting member 2 and a second building structural member or supported member 3. As shown in FIG. 1, the supporting member 2 can be a horizontal beam and/or concrete flooring member 2 and the supported member 3 can be a vertically-oriented, channel-shaped wall stud 3, although for purposes of the invention the supported member could be a horizontal beam and/or concrete flooring member and the supporting member could be a vertically-oriented wall stud.

The connection 1 between the supporting member 2 and the supported member 3 is made with the slide clip 4 of the present invention. As shown in FIG. 1, the slide clip 4 has an anchoring leg 5 fastened to the supporting member 2 and a sliding leg 6 connected to the supported member 3. As mentioned above, the sliding leg 6 could be attached to the supporting member 2 such that the connection allows movement between the sliding leg 6 and the supporting member 2. Preferably, the anchoring leg 5 and the sliding leg 6 are generally planar and joined at right angles to each other. The connection 1 is also made with a slider 7 that in combination with the sliding clip 4 make up the connector 8 of the present invention, and first and second fasteners 9 and 10. In the most common embodiments, the slide clip 4 and slider 7 allow for relative vertical movement between the supporting and the supported members 2 and 3, or a combination of vertical and horizontal movement between the supporting and the supported members 2 and 3. A change in orientation of the components of the connection 1 would allow the connector 8 to permit different relative movements between the components. The slide clip 4 and the slider 7 are preferably made from cold formed sheet steel, bent, cut, embossed and punched on automated or semi-automated manufacturing machinery. As shown in the drawings, preferably, the supported members 3 are cold-formed steel structural members. Preferably, the supporting members 2 can be a concrete floor member or steel structural members.

Figure 4:
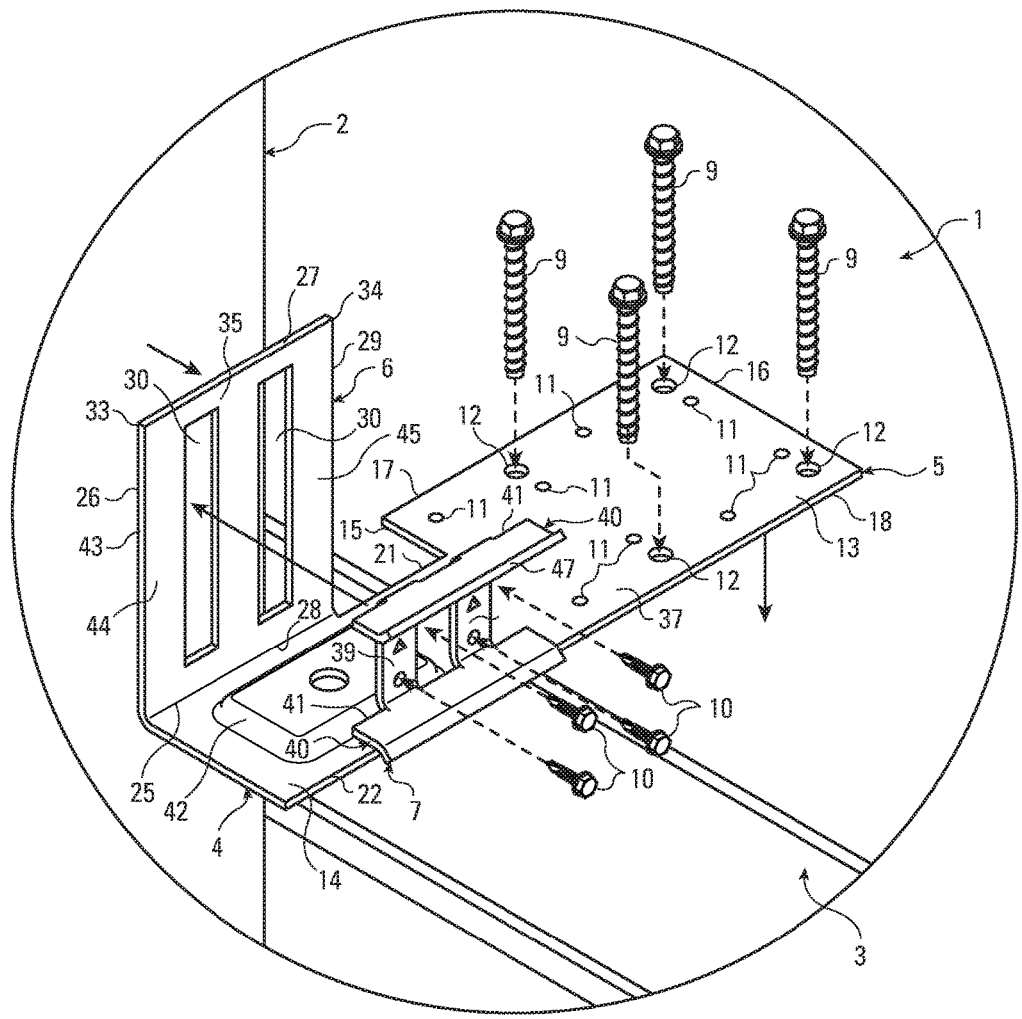
FIG. 4 is an exploded, detail perspective view of the connection of FIG. 1, taken along line FIG. 4 of FIG. 2.
Figure 5:
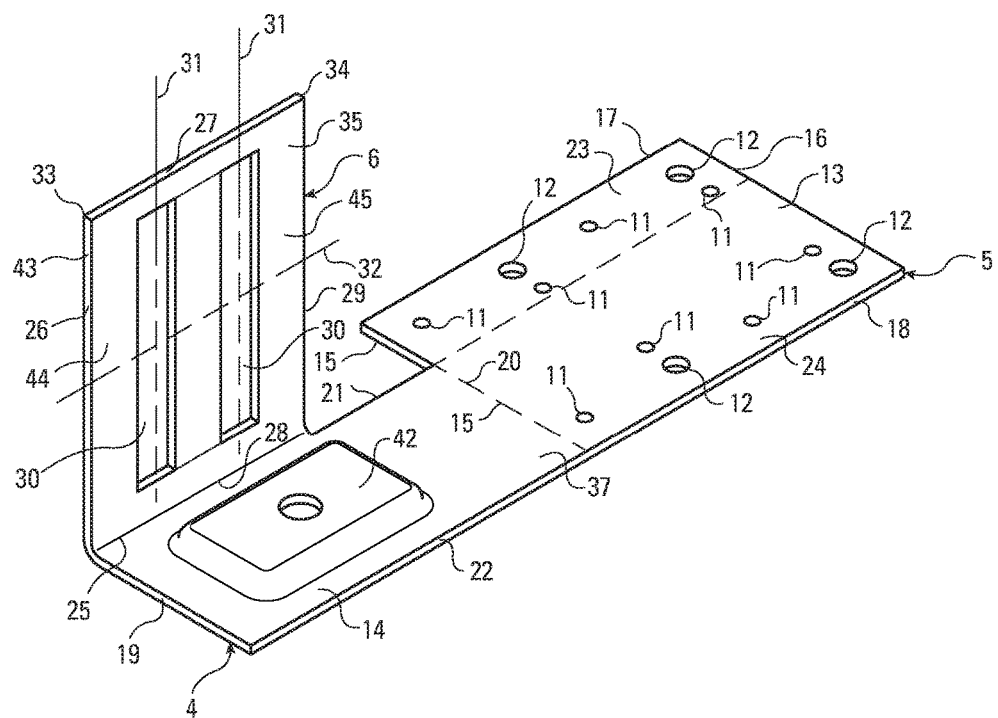
FIG. 5 is a perspective view of a slide clip of a connector of the present invention. The slider is not shown.

As shown in FIGS. 4 and 5, in one embodiment of the invention, the anchoring leg 5 has a plurality of small fastener openings 11 and a plurality of enlarged fastener openings 12.

Figure 6:
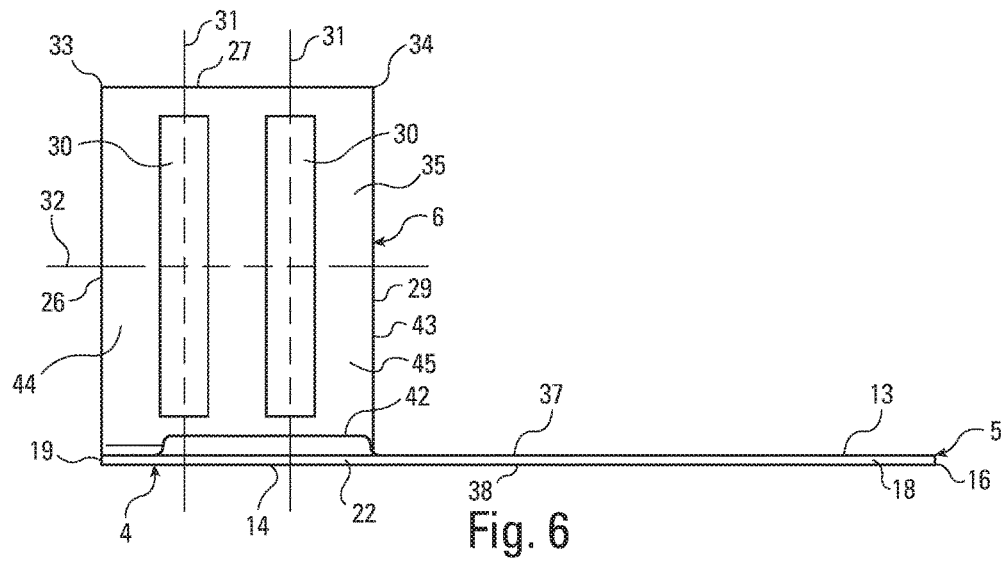
FIG. 6 is a front view of the slide clip of FIG. 5.
Figure 7:
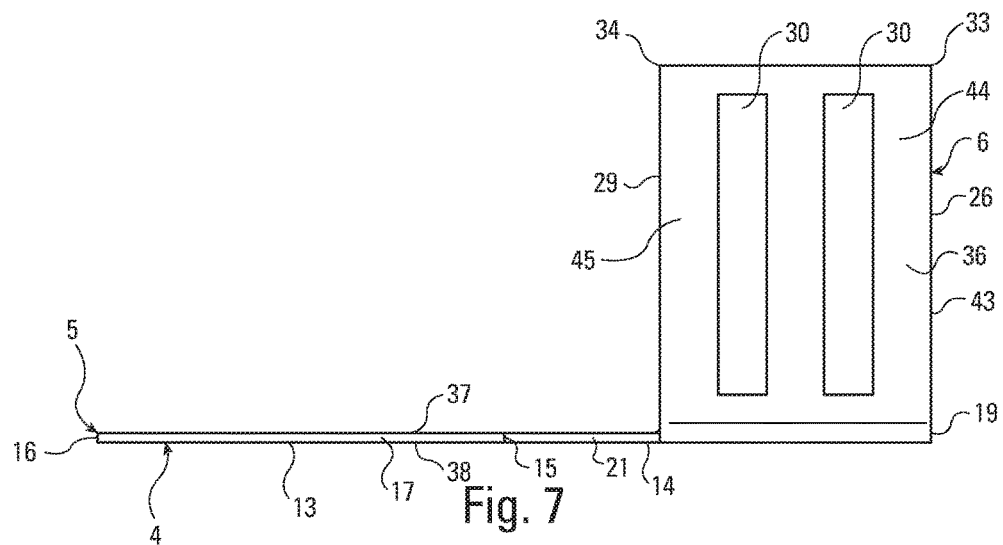
FIG. 7 is a back view of the slide clip of FIG. 5.
Figure 8:
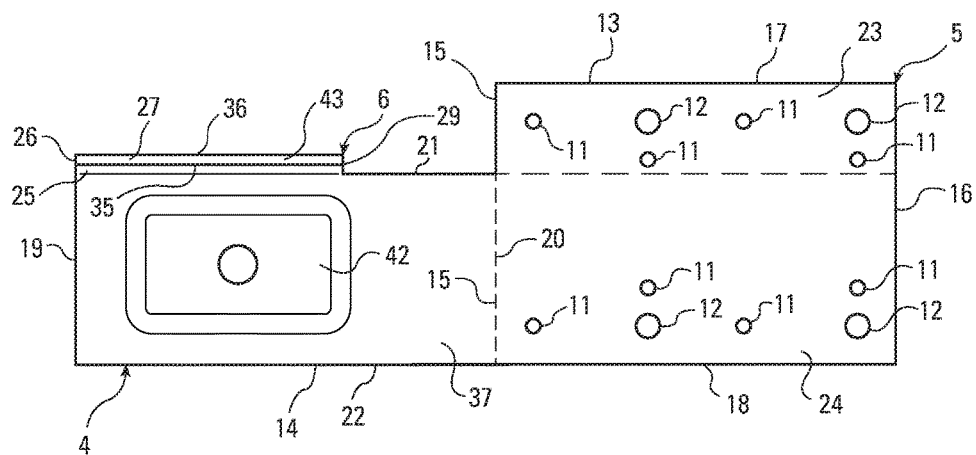
FIG. 8 is a top view of the slide clip of FIG. 5.
Figure 9:
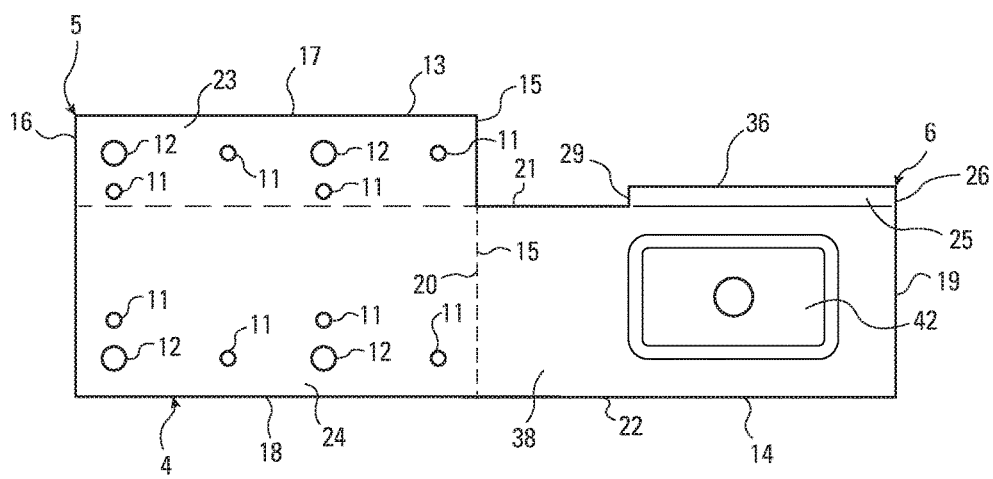
FIG. 9 is a bottom view the slide clip of FIG. 5.
Figure 10:
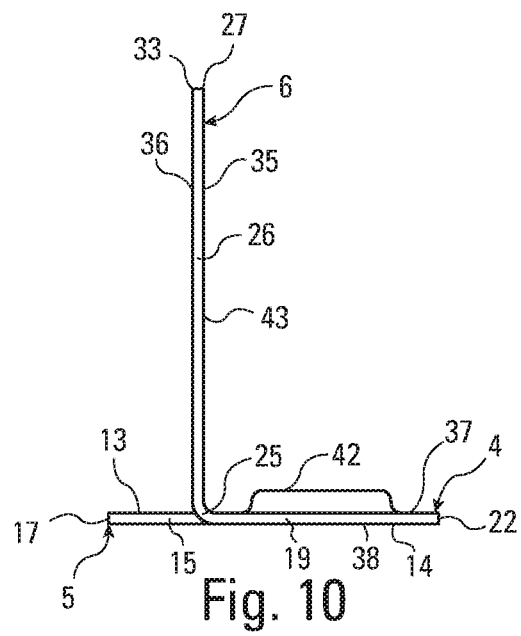
FIG. 10 is a left side view of the slide clip of FIG. 5.
Figure 11:
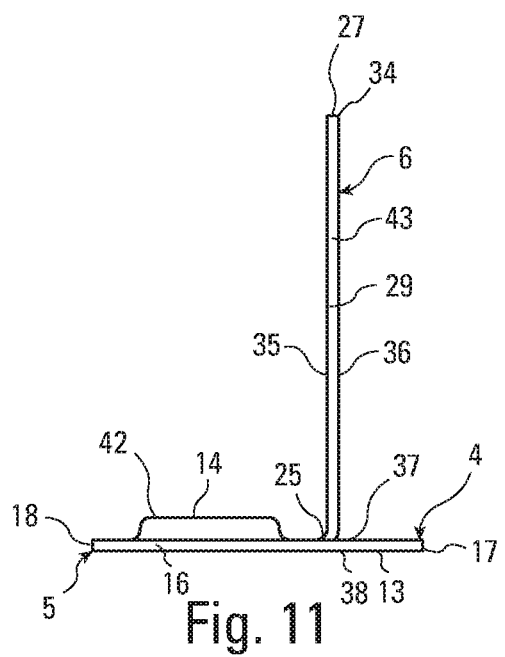
FIG. 11 is a right side view the slide clip of FIG. 5.

As shown in FIGS. 5, 6 and 7, the anchoring leg 5 has a distal section 13 and a proximal section 14 that are preferably substantially planar members that are preferably rectangular and are disposed in substantially the same plane. The proximal section 15 extends or projects away from the front surface 35 and the supported member 3. The distal section 9 has an inner edge 15, an outer edge 16, a left side edge 17 and a right side edge 18. The proximal section 14 has an inner edge 19, an outer edge 20, a left side edge 21 and a right side edge 22. The juncture between the distal and proximal sections 13 and 14 of the anchoring leg 5 at the outer edge 20 of the proximal section 14 and the inner edge 15 of the distal section 13 is shown as a dotted line in FIGS. 3, 5 and 8. Preferably, the distal and proximal sections 13 and 14 are joined at the outer edge 20 of the proximal section 14 and the inner edge 15 of the distal section 13 with the inner edge 15 of the distal section 13 being longer than the outer edge 20 of the proximal section 14 such that the distal section 13 is wider than the proximal section 14. Preferably, the right side edges 18 and 22 of the distal and proximal sections 13 and 14 are aligned, and the left side edge 21 of the proximal section 14 intersects with the inner edge 15 of the distal section 13, and if the left side edge 21 of the proximal section 14 were to extend through the distal section 13, the left side edge 21 of the proximal section 14 would divide the distal section 13 into left and right portions 23 and 24, as shown in FIGS. 3, 5, 8 and 9. As shown in FIGS. 8, 9 and 11, the sliding leg 6 is attached, preferably by a bend 25, to the left side edge 21 of the proximal section 14.

As shown in FIGS. 8 and 9, in the preferred embodiment of the present invention the anchoring leg 5 is shaped so that fastener openings 11 and 12 are provided on both sides of the sliding leg 6. As shown in FIG. 8, preferably, the sliding leg 6 is a substantially planar member defining a first plane 43 and the anchoring leg 5 is a substantially planar member set orthogonally to the sliding leg 6 with the projection of plane 43 defined by the sliding leg 6 intersecting the distal section 13 of the anchoring leg 5 and dividing the distal section 13 of the anchoring leg into a left portion 23 and a right portion 24.

Figure 22:
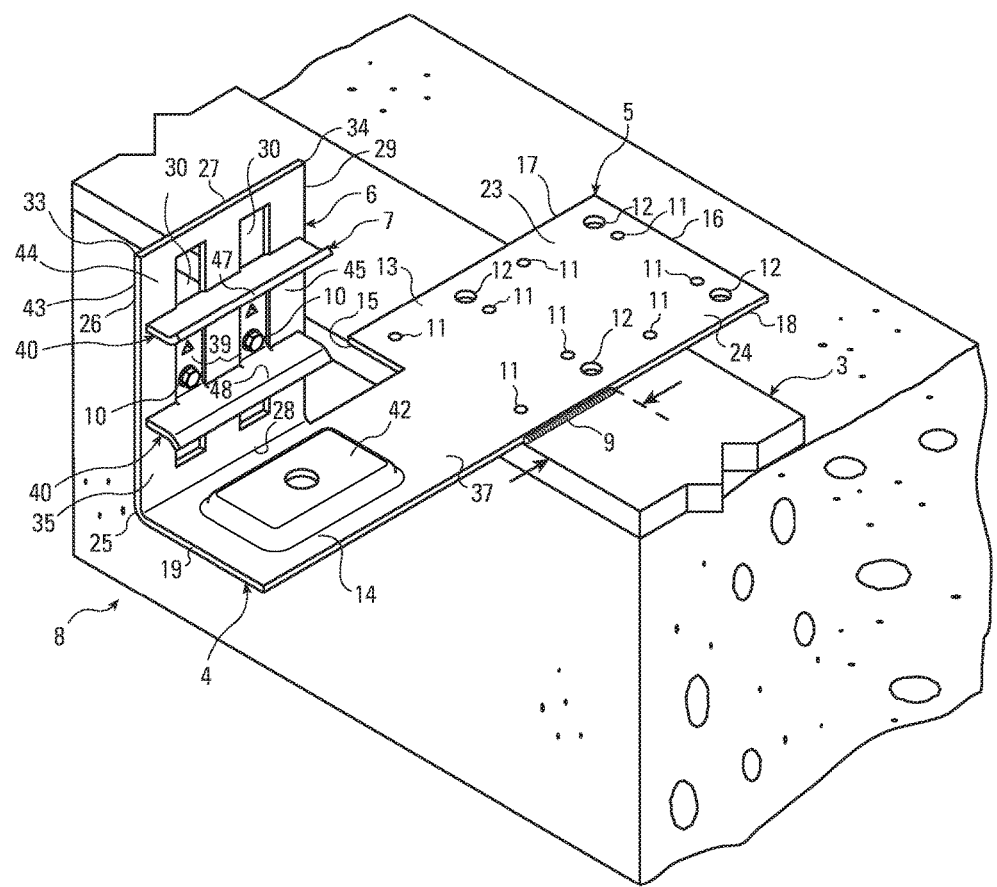
FIG. 22 is a partial, perspective view of a connection formed according to the present invention. The vertical stud or supported member is not shown.
Figure 23:
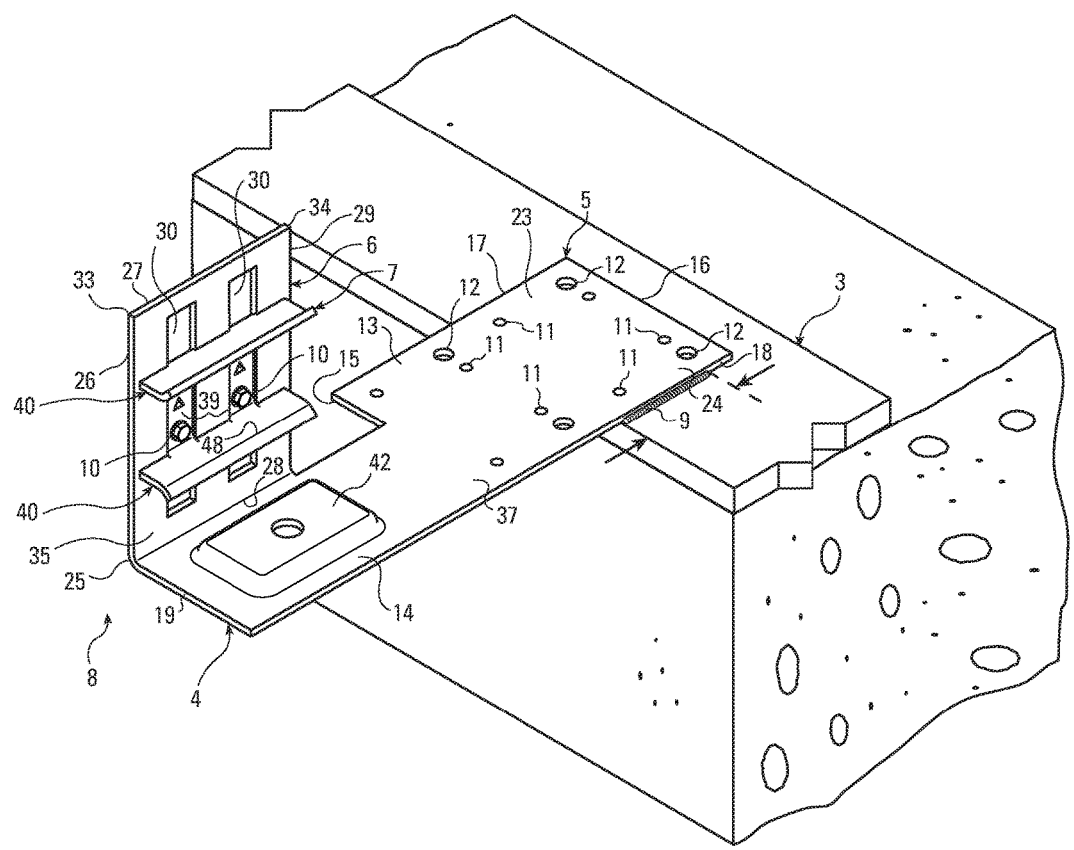
FIG. 23 is a partial, perspective view of a connection formed according to the present invention. The vertical stud or supported member is not shown.

As shown in FIG. 8, the distal section 13 of the anchoring leg 5 extends or projects away from both the back and front sides or surfaces 35 and 36 of the sliding leg 6, and, if all specified fasteners are used as shown in FIG. 1, the first fasteners 9 attach the distal section 13 of the anchoring leg 5 to the supporting member 2 and at least one of the first fasteners 9 attaches a portion 24 of the distal section 13 that extends or projects from the front side or surface 36 of the sliding leg 6, and at least one of the first fasteners 9 attaches a portion 23 of the distal section 13 that extends from the back side or surface 35 of the sliding leg and on the same side of the sliding leg 6 as the supported member 3. It is to be noted that sliding leg 6 does not itself intersect with the distal section 13 of the anchoring leg 5, and it is the projection of first plane 43 that intersects with the distal section 13. Preferably, the fastener openings 11 and 12 are arranged in the distal section 13 of the anchoring leg 5 in pairs with a first fastener opening of each pair being disposed in the left portion 23, and a second fastener opening of each pair being disposed in the right portion or section 24. As shown in FIGS. 22 and 23 the anchoring leg 5 is attached to a metal member of the supporting member 2 by welds 9. The weld 9 on the right portion 24 is shown and a similar weld 9 would attach the left portion 23.

Figure 18:
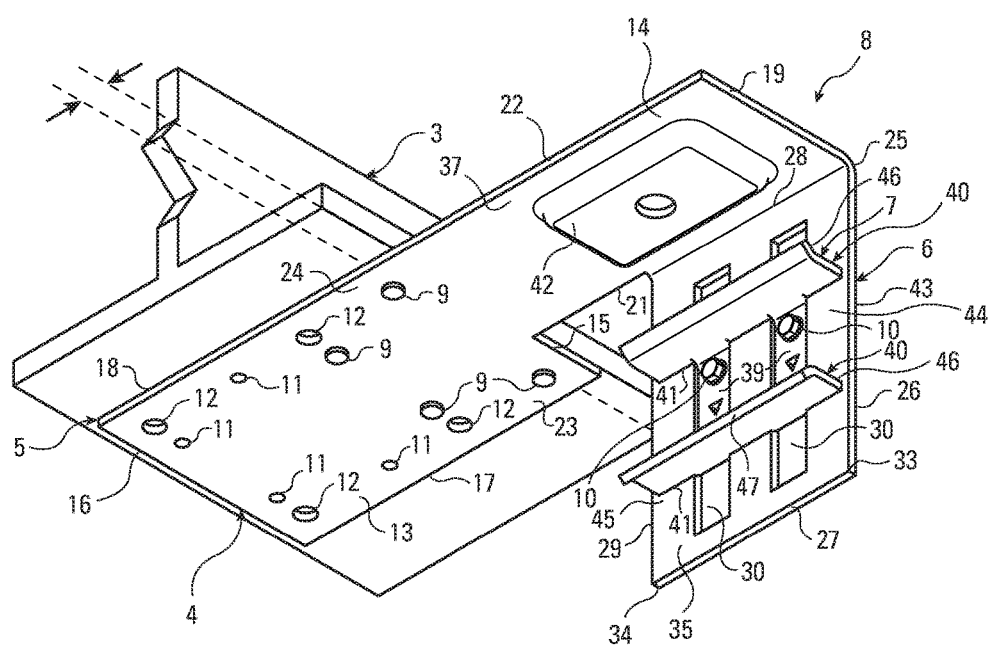
FIG. 18 is a partial, perspective view of a connection formed according to the present invention. The vertical stud or supported member is not shown.
Figure 19:
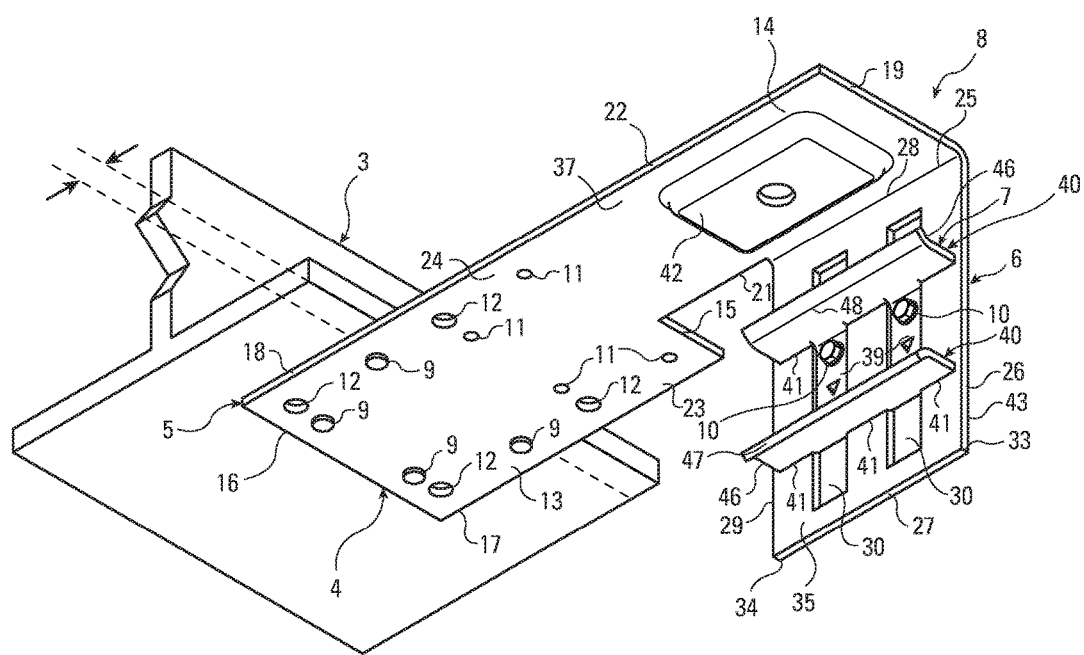
FIG. 19 is a partial, perspective view of a connection formed according to the present invention. The vertical stud or supported member is not shown.
Figure 20:
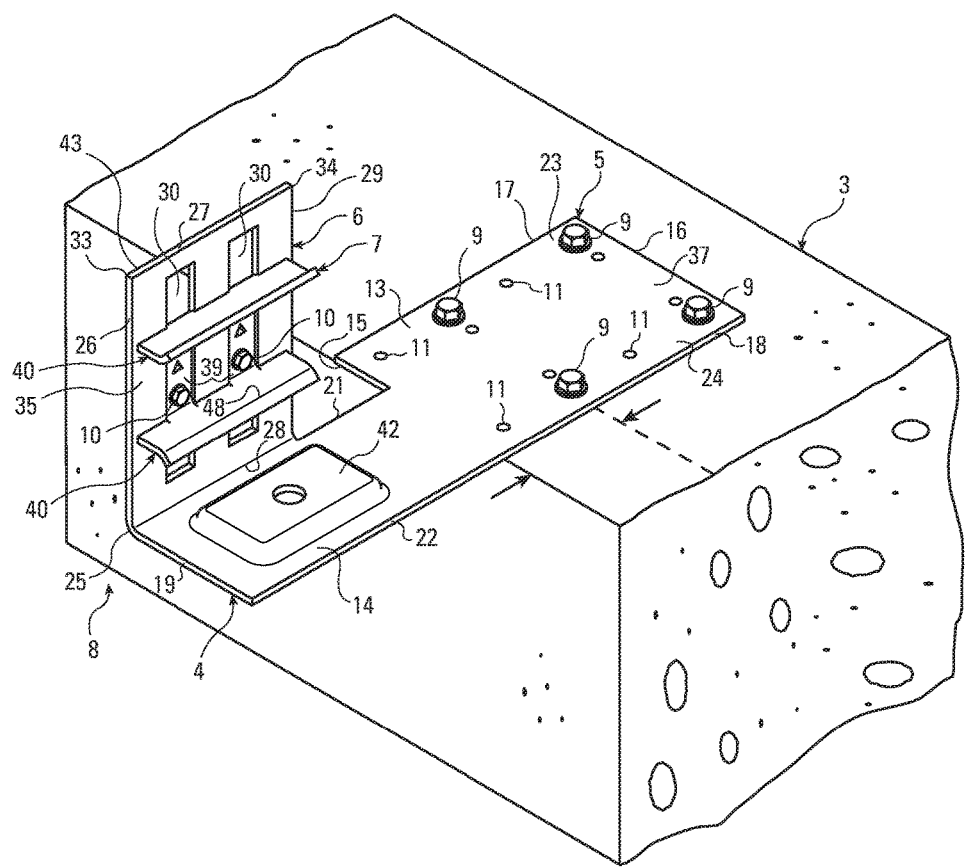
FIG. 20 is a partial, perspective view of a connection formed according to the present invention. The vertical stud or supported member is not shown.
Figure 21:
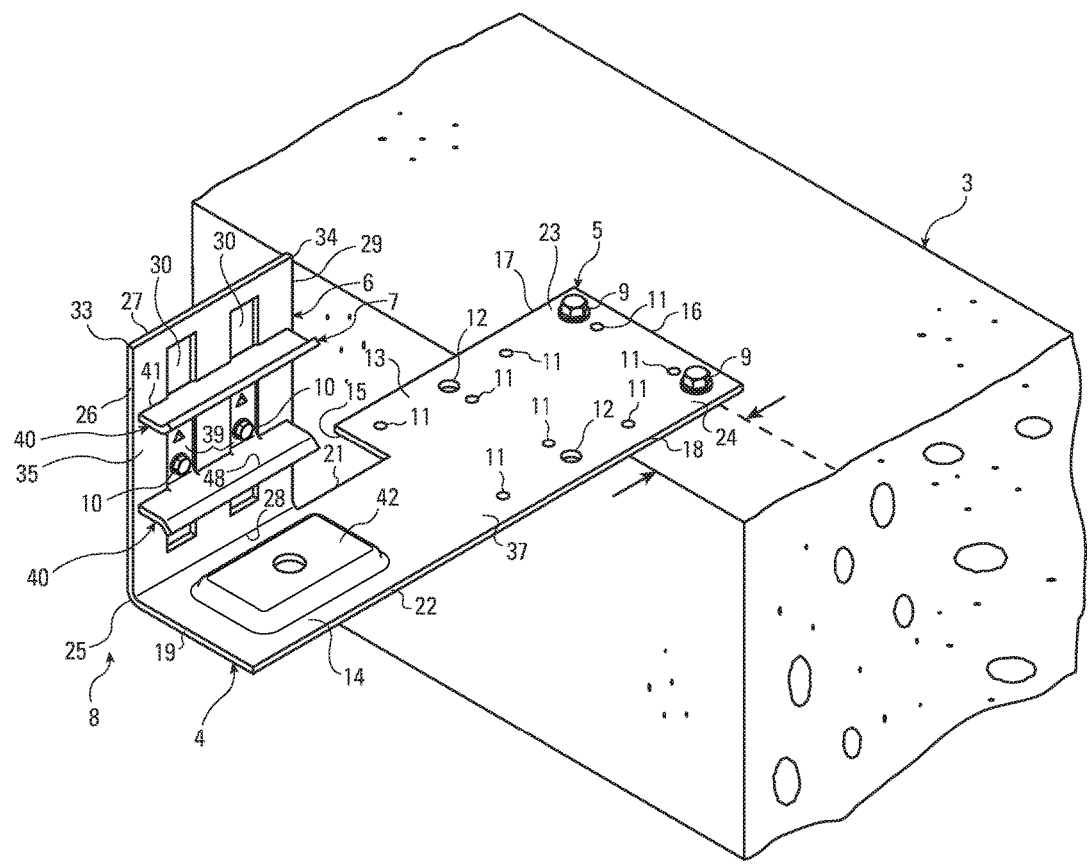
FIG. 21 is a partial, perspective view of a connection formed according to the present invention. The vertical stud or supported member is not shown.

As shown in FIGS. 18 and 19, multiple sets or pairs of fastener openings 11 and 12 are arranged in the distal section 13 of the anchoring leg 5 so that the connector 8 can be placed at different locations on the supporting member 2 to accommodate different distances between the supported member 3 and the supporting member 2 while still allowing for proper placement of the first fasteners 9 that attach to the supporting member 2. Preferably, the first fasteners are spaced a sufficient distance from the edge of the supporting member 2 and from each other, while being as close as they can be to the supported member 3.

As shown in FIGS. 5 and 6, the sliding leg 6 preferably has an inner edge 26, a top edge 27 and a bottom edge 28, and an outer edge 29. The sliding leg is formed with one or more openings 30 to receive the slider. Preferably, the openings 30 of the sliding leg 6 are a plurality of elongated slots 30 disposed in parallel arrangement. Each elongated slots 30 has a major axis 31 along which the slots are elongated, and a minor axis 32 that is disposed orthogonally to the major axis 31. Preferably the slots 30 are parallel with respect to their major axes 31. The inner edge 16 of the sliding leg 6 intersects the top edge 17 at a first corner juncture 33. The outer edge 29 of the sliding leg 6 intersects the top edge 17 at a second corner juncture 34. As shown in FIG. 5, the major axes 31 of the elongated slots 30 project along the direction in which relative movement between the connector 8 and the supported member 3 is desired. Typically, the desired movement is vertical movement. As noted above, preferably, the sliding leg 6 is a substantially planar member; however, the sliding leg 6 need only have aligned, substantially planar portions 44 and 45 to the sides of the one or more openings 30 for receiving the slider 7. The aligned, substantially planar portions 44 and 45 to the sides of the one or more openings 30 also define first plane 43, and the front and back surfaces 35 and 36 of the sliding leg 6. In the preferred embodiment, the substantially planar portions 44 and 45 are to the left and right of the openings 30 on the minor axis 32 of the openings 30 and the substantially planar sections 44 and 45 extend a substantial distance upwardly and downwardly along the major axes 31 of the openings 30.

The left side edge 21 of the proximal section 14 of the anchoring leg 5 is joined to the bottom edge 28 of the sliding leg 6 at bend 25. Preferably, bend 25 is 90 degrees.

As noted above, the substantially planar sliding leg 6 is preferably formed with a preferably planar front surface 35 a preferably planar back surface 36 facing in the opposite direction. As shown in FIG. 1, the back surface 36 of the sliding leg 6 faces the supported member 3 and interfaces with a preferably planar portion of the supported member 3. Similarly, the substantially planar anchoring leg 5 has a top surface 37 and a bottom surface 38 facing in the opposite direction. As shown in FIG. 1, the bottom surface 38 interfaces with the supporting member 2. The top surface 37 can also interface with the supporting member 2 as shown in FIG. 19.

Figure 12:
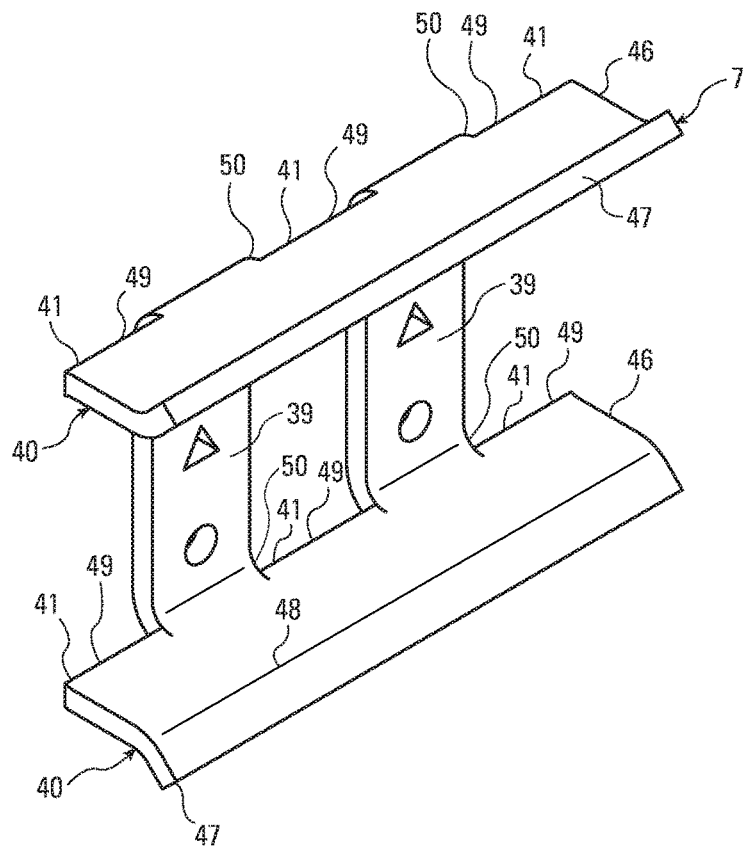
FIG. 12 is a perspective view of a slider of the present invention.
Figure 13:
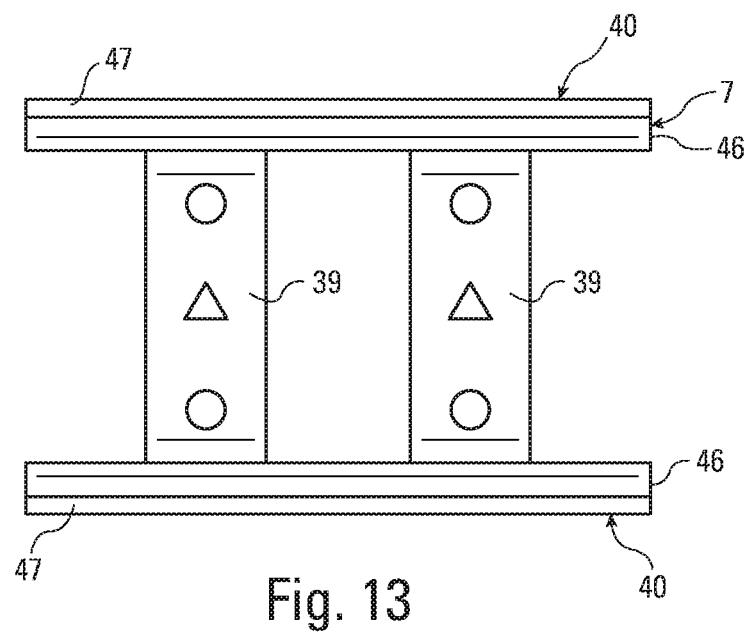
FIG. 13 is a top view of the slider of FIG. 12.
Figure 14:
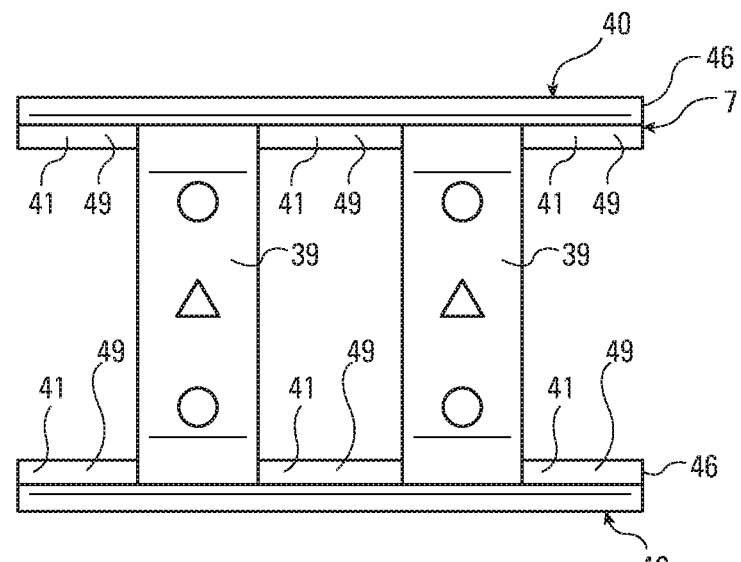
FIG. 14 is a bottom view of the slider of FIG. 12.
Figure 15:
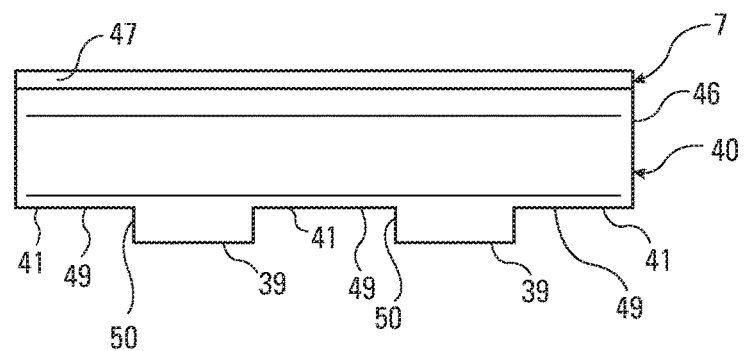
FIG. 15 is a front view of the slider of FIG. 12. The back view is the same.
Figure 16:
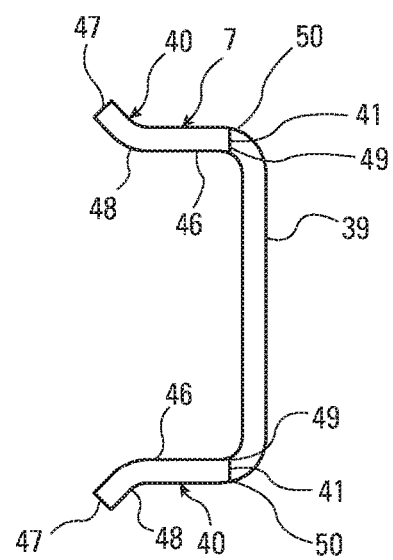
FIG. 16 is a side view of the slider of FIG. 12. The other side view is the same.
Figure 17:
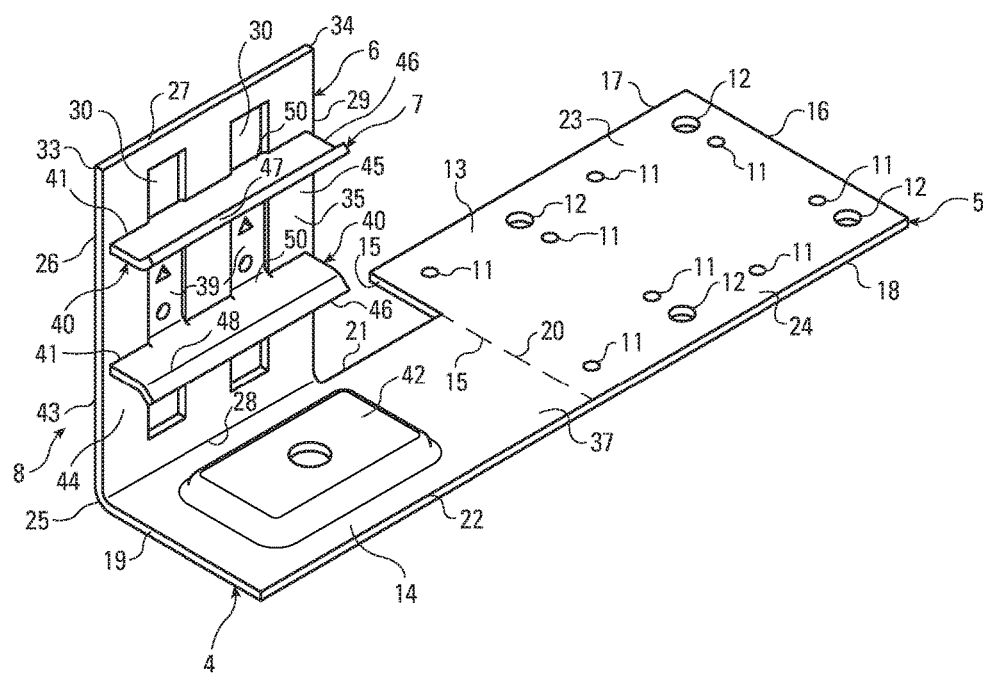
FIG. 17 is a perspective view of a connector formed according to the present invention. The slider is shown received by the slide clip.

As shown in FIG. 1, in a preferred embodiment, the sliding leg 6 is connected to the supported member 3 by means of a slider 7. The slider 7 is rigidly secured to the supported member 3 such that it cannot move with respect to the supported member 3. The slider 7 connects the sliding leg 6 to the supported member 3 such that the sliding leg 6 can move with respect to the supported member 3. As shown in FIG. 12, the slider 7 preferably has one or more base components 39 that are disposed in the one or more elongated slots 30 of the sliding leg 6 and at least one securing component 40 that prevents the sliding leg 6 from disengaging from the supported member 3. The base components are formed with fastener openings to receive the second fasteners 10. The securing component 40 rises from the one or more base components 39 and overlies portions of the front surface 35 of the sliding leg 6. The one or more base components 39 are of a smaller dimension, both in the directions of the major axes 31 and the minor axes 32, than the one or more elongated slots 30 so that they can be received in and move with respect to the slots 30. Preferably, the one or more base components 39 fit closely within the elongated slots 30 along their minor axis 31, while the base components 39 are preferably considerably smaller than the slots 30 along the major axes 31. The one or more securing components 40 preferably have containment surfaces 41 that are in close proximity to the front surface 35 of the sliding leg 6 to prevent the sliding leg 6 from substantially pulling away from the supported member 3. Preferably the containment surfaces 41 are disposed on either side of the slots 30. Preferably the securing component 40 is formed as one or more generally planar upstanding flanges 46 connected to and set at an angle to the one or more base components 39, such that a projection along the generally planar upstanding flange would intersect with the sliding leg 6. Preferably, the upstanding flanges 46 are disposed generally orthogonally to the base components 39 and the sliding leg 6. Preferably the one or more upstanding flanges 46 have an outer edge 47 and the upstanding flanges are formed with lateral bends 48 or embossments to provide additional strength to the flanges 46. Preferably, the containment surfaces 41 are formed on the bottom edges 49 of the flanges 46, as best shown in FIGS. 12 and 14. The bottom edges 49 are generally opposed to the outer edges 47 of the flanges 46. The bottom edges 49 of the flange 46 are interrupted by one or more projecting arms 50 that extend to and connect the one or more upstanding flanges 46 to the one or more base components 39.

Preferably, there are two base components 39 and the one or more securing components 40 connect the two base components 39

As shown in FIG. 5, the anchoring leg 5 of the sliding clip 4 includes a first embossment 42. The first embossment 42 is located close to the inner edge 19 of the proximal section of the anchoring leg 5. The first embossment 42 reinforces the anchoring leg 5.

Preferably, a first plurality of fasteners 9 attaches the anchoring leg 5 to the supporting member 2. A second plurality of fasteners 10 preferably attaches the slider 7 to the supported member 3. Preferably, the fasteners 10 of the second plurality of fasteners 10 are screws 28. The preferred fasteners 9 for attaching the anchoring leg 5 to a supporting member 2 made from steel are hex-head screws 9, automated power-actuated gun-driven fasteners 9 or, alternatively, welds 9, as shown in FIGS. 22 and 23. The preferred fasteners 9 for attaching the anchoring leg 5 to supporting member 2 made from concrete are concrete screws or anchors 9.

We claim:

1. A structural connection in a building, comprising:
   a. a supporting member having a horizontally extending surface;
   b. a supported member disposed substantially orthogonally to the horizontally extending surface and extending above and below the horizontally extending surface on an axis that is orthogonal to the horizontally extending surface;
   c. a connector connecting the supported member to the supporting member, the connector including:
      i. a slide clip having a sliding leg disposed in close proximity to the supported member, the sliding leg having one or more openings, the one or more openings being bracketed by first and second substantially planar portions that are substantially aligned, the first and second substantially planar portions of the sliding leg defining a front surface and a back surface on opposite sides of the sliding leg of the slide clip, the back surface of the sliding leg interfacing with the supported member, and a single-piece, substantially planar anchoring leg connected to the sliding leg and connected to the supporting member with the substantially planar anchoring leg interfacing with the horizontally extending surface of the supporting member, the anchoring leg having a proximal section that is connected to the sliding leg and a distal section that is connected to the proximal section, the proximal section of the anchoring leg projecting away from the front surface of the sliding leg, the supported member being connected to the slide clip so that the supported member is configured to move relative to the sliding leg of the connector; and ii. a slider, the slider having one or more base components that are received in the one or more openings of the sliding leg, and a securing component that is attached to the one or more base components, the securing component having a plurality of containment surfaces that are aligned and are disposed in close proximity to the front surface of the first and second aligned, substantially planar portions of the sliding leg;

d. one or more first fasteners connect the anchoring leg to the supporting member;

e. one or more second fasteners connect the slider to the supported member; and wherein f. the distal section of the anchoring leg projects away from both the front and back surfaces of the sliding leg, and the first fasteners attach the distal section of the anchoring leg to the supporting member, and at least one of the first fasteners engages a portion of the distal section that projects away from the back surface of the sliding leg, on a same side of the sliding leg as the supported member.

2. The connection of claim 1, wherein:
at least one of the first fasteners engages a portion of the distal section that projects away from the front surface of the sliding leg.

3. The connection of claim 1, wherein:
at least one of the first fasteners engages a portion of the distal section that is substantially in line with the front surface of the sliding leg and the portion of the distal section that projects away from the back surface of the sliding leg, on the same side of the sliding leg as the supported member.

4. The connection of claim 3, wherein:
at least one of the first fasteners engages a portion of the distal section that projects away from the front surface of the sliding leg.

5. The connection of claim 1, wherein:
the sliding leg and the distal portion of the anchoring leg are substantially planar members disposed at angles to each other.

6. The connection of claim 5, wherein:
at least one of the first fasteners engages a portion of the distal section that projects away from the front surface of the sliding leg.

7. The connection of claim 5, wherein:
at least one of the first fasteners engages a portion of the distal section that is substantially in line with the front surface of the sliding leg and the portion of the distal section that projects away from the back surface of the sliding leg, on the same side of the sliding leg as the supported member.

8. The connection of claim 7, wherein:
at least one of the first fasteners engages a portion of the distal section that projects away from the front surface of the sliding leg.

9. The connection of claim 1, wherein:
the sliding leg has a plurality of openings.

10. The connection of claim 9, wherein the plurality of openings in the sliding leg are a plurality of substantially parallel elongated slots.

11. A structural connection in a building, comprising:
a. a supporting member;
b. a supported member;
c. a connector connecting the supported member to the supporting member, the connector including:
i. a slide clip having a sliding leg disposed in close proximity to the supported member, the sliding leg having one or more openings, the one or more openings being bracketed by first and second substantially planar portions that are substantially aligned, the first and second substantially planar portions of the sliding leg defining a front surface and a back surface on opposite sides of the sliding leg of the slide clip, the back surface of the sliding leg interfacing with the supported member, and an anchoring leg connected to the sliding leg and connected to the supporting member, the supported member being connected to the slide clip so that the sliding leg of the connector is configured to move relative to the supported member; and
ii. a slider, the slider having one or more base components that are received in the one or more openings of the sliding leg, and a securing component that is attached to the one or more base components, the securing component having a plurality of containment surfaces that are aligned and are disposed in close proximity to the front surface of the first and second aligned, substantially planar portions of the sliding leg;

d. one or more first fasteners connect the anchoring leg to the supporting member;

e. one or more second fasteners connect the slider to the supported member; and wherein f. the securing component has one or more substantially planar upstanding flanges connected to and set at an angle to the one or more base components, such that a projection along the substantially planar upstanding flange is configured to intersect with the sliding leg, and each of the one or more upstanding flanges in a continuous member that extends over at least one of the one or more openings of the sliding leg and also extends over substantial portions of the first and second substantially planar portions of the sliding leg.

12. The connection of claim 11, wherein: the one or more upstanding flanges of the slider extend substantially above the sliding leg.

13. The connection of claim 12, wherein the one or more upstanding flanges have an outer edge and one or more bottom edges that are substantially opposed to the outer edges, the containment surfaces are formed on the one or more bottom edges of the flanges.

14. The connection of claim 13, wherein:
the bottom edges of the one or more flanges are interrupted by one or more projecting arms that extend to and connect the one or more upstanding flanges to the one or more base components.

15. The connection of claim 14, wherein: the upstanding flange are disposed substantially orthogonally to the base components and the sliding leg.

16. The connection of claim 15, wherein:
the containment surfaces are disposed on either side of the openings.

17. The connection of claim 16, wherein:
the upstanding flanges are formed with lateral bends or embossments to provide additional strength to the flanges.

18. The connection of claim 11, wherein:
a. the anchoring leg having a proximal section that is connected to the sliding leg and a distal section that is connected to the proximal section, the proximal section of the anchoring leg projecting away from the front surface of the sliding leg, and
b. the distal section of the anchoring leg projects away from both the front and back surfaces of the sliding leg, and the first fasteners attach the distal section of the anchoring leg to the supporting member, and at least one of the first fasteners engages a portion of the distal section that projects away from the back surface of the sliding leg, on a same side of the sliding leg as the supported member.

19. The connection of claim 18, wherein:
at least one of the first fasteners engages a portion of the distal section that projects away from the front surface of the sliding leg.

20. The connection of claim 18, wherein:
at least one of the first fasteners engages a portion of the distal section that is substantially in line with the front surface of the sliding leg and the portion of the distal section that projects away from the back surface of the sliding leg, on the same side of the sliding leg as the supported member.

\* \* \* \* \*

UNITED STATES PATENT AND TRADEMARK OFFICE
CERTIFICATE OF CORRECTION

PATENT NO. : 10,273,679 B2
APPLICATION NO. : 15/405125
DATED : April 30, 2019
INVENTOR(S) : Larry Randall Daudet et al.

Page 1 of 1

It is certified that error appears in the above-identified patent and that said Letters Patent is hereby corrected as shown below:

In the Claims

Column 8, Line 52 in Claim 11 f. should read: . . .each of the one or more upstanding flanges is a . . .

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*